Aug. 16, 1955 D. P. BARLOW 2,715,672
PRESSURE COOKING APPARATUS
Filed Dec. 24, 1953
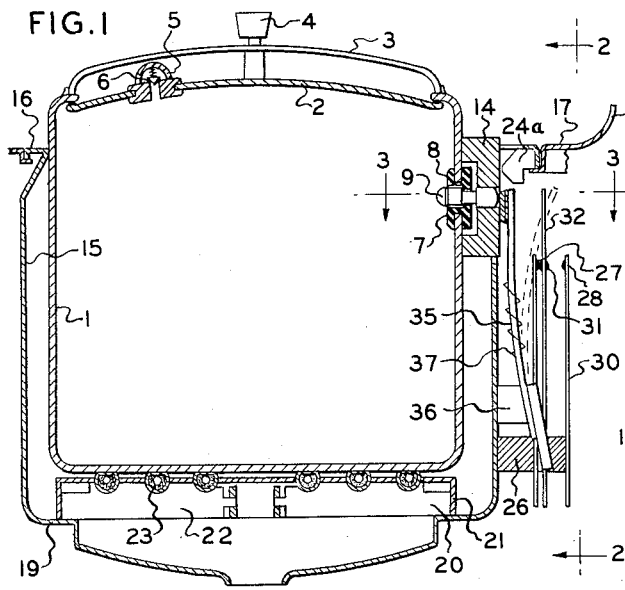
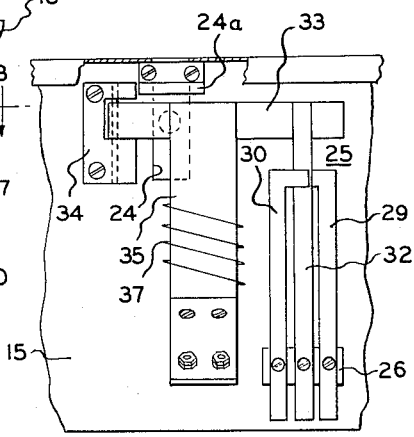
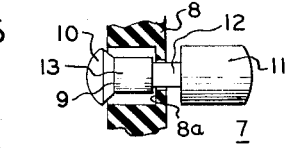
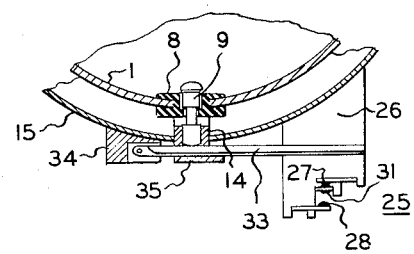
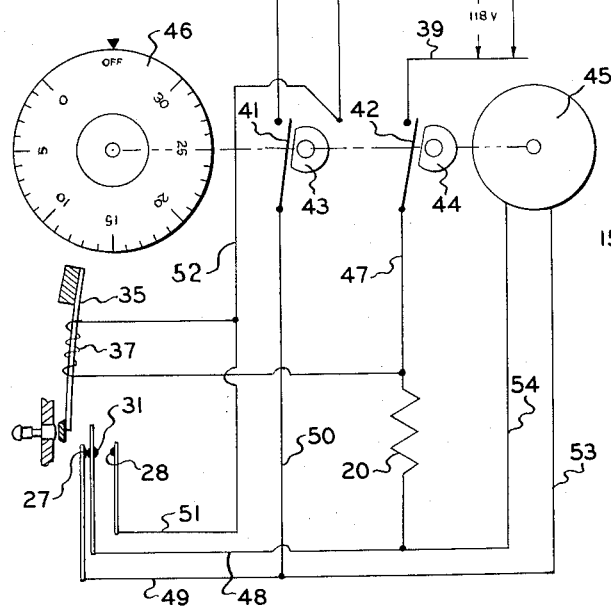
INVENTOR.
DANIEL P. BARLOW
BY
HIS ATTORNEY

United States Patent Office 2,715,672
Patented Aug. 16, 1955

2,715,672

PRESSURE COOKING APPARATUS

Daniel P. Barlow, Schenectady, N. Y., assignor to General Electric Company, a corporation of New York Application December 24, 1953, Serial No. 400,222

7 Claims. (Cl. 219—43)

My invention relates to pressure cooking apparatus, and more particularly to means for automatically controlling the operation of such apparatus.

One of the objects of my invention is to provide automatic pressure cooking apparatus having improved means for controlling its operation in accordance with the pressure in the cooking vessel and for venting the vessel at the end of the cooking operation.

Another object of my invention is to provide automatic pressure cooking apparatus including a cooking vessel adapted to rest in a receptacle supported below the cooking top of an electric range and heat control means in the range engageable with the vessel and responsive to the pressure therein.

Another object of my invention is to provide automatic pressure cooking apparatus including an improved pressure responsive valve for controlling the heating circuit of the apparatus.

Further objects and advantages of my invention will become apparent as the following description proceeds, and the features of novelty which characterize my invention will be pointed out with particularity in the claims annexed to and forming a part of this specification.

Briefly stated, in accordance with one aspect of my invention, I provide a pressure cooking vessel having a pressure valve in one wall thereof, a heating unit for the vessel connected in a control circuit including a time switch and a heat control switch mounted on the supporting structure for the vessel, and a bimetallic arm normally biasing the pressure valve to its venting position but movable when heated to a disengaged position in which the valve is free to actuate the control switch in accordance with the pressure in the vessel. Preferably the heating unit is mounted at the bottom of a receptacle suspended in the cooking top of an electric range, and the cooking vessel is arranged to be supported in the receptacle with the pressure valve in operative relationship with the other components of the apparatus. During operation the pressure control system effects a reduction in the heat output of the heating unit when the pressure in the vessel approaches the desired cooking pressure and vents the vessel at the end of the timed cooking operation.

For a better understanding of my invention, reference may be made to the accompanying drawing in which:

Fig. 1 is a sectional view showing pressure cooking apparatus constructed in accordance with my invention.

Fig. 2 is a fragmentary elevation view taken along the line 2—2 of Fig. 1.

Fig. 3 is a sectional view taken along the line 3—3 of Fig. 1.

Fig. 4 is similar to Fig. 3 but shows the parts as they appear during a cooking operation under normal pressure conditions.

Fig. 5 is a detail view of the pressure valve of my invention.

Fig. 6 is a diagramatic view showing the elements and arrangement of the control circuit for the apparatus shown in Fig. 1.

Referring to the drawing, the numeral 1 designates a pressure cooking vessel having an open top which may be closed and sealed by a cover 2, the sealing mechanism including a support 3 and a handle or knob 4. Cover sealing mechanisms for pressure vessels are well known in the art and since the manner in which the cover is sealed does not form a part of the present invention, further description of the sealing mechanism is believed to be unnecessary. Mounted in the cover 2 is a pressure relief valve 5 including a spring 6 or other suitable means for maintaining a predetermined pressure in vessel 1 during cooking operations. For example valve 5 may be arranged to open when the pressure in vessel 1 exceeds fifteen pounds per square inch, the pressure most commonly employed in pressure cooking operations.

Mounted in the side wall of vessel 1 is a pressure valve 7 comprising a resilient deformable gasket 8 made of rubber, for example, secured in an aperture in one wall of the vessel and a cylindrical plunger 9 mounted in a circular opening in gasket 8 for reciprocating movement in accordance with the pressure in vessel 1. Plunger 9 is movable in response to pressure within vessel 1 from a retracted venting position to an intermediate sealing position and also to an extended position in which control means for controlling my apparatus are actuated as hereinafter explained. As shown in Fig. 5 plunger 9 includes enlarged end portions 10 and 11 of substantially greater diameter than the diameter of the circular opening in gasket 8, an intermediate stem portion 12 of lesser diameter than the diameter of the gasket opening, and an intermediate enlarged portion 13 having a diameter less than the diameter of end portions 10 and 11 but greater than that of the opening in gasket 8. End portion 11 of plunger 9 is supported for reciprocating movement in a guide member 14 fixedly secured to vessel 1. It will be observed that when the plunger 9 is in the retracted position shown in Fig. 1 the opening in gasket 8 is not sealed by enlarged portion 13. Thus when the plunger is in this position at the beginning of a cooking operation air will be exhausted through pressure valve 7 until steam starts to escape, at which time some of the steam condenses and forms a water seal around plunger 9. Internal pressure then increases sufficiently to force portion 13 into engagement with portion 8a of gasket 8. Also at the end of a cooking operation pressure will be vented from vessel 1 if plunger 9 is held in this retracted position by suitable external biasing means hereinafter described. Furthermore, it will be noted that the diameters of portion 13 and the opening in gasket 8 are such that a predetermined pressure within vessel 1 will force the plunger to an extended position in which enlarged end portion 10 is moved into sealing engagement with portion 8a of gasket 8.

In the preferred embodiment of my invention pressure cooking vessel 1 is supported on and heated by a deep well cooking unit mounted in the cooking top of an electric range. As shown in Fig. 1 the deep well heating unit preferably comprises a generally cylindrical receptacle 15 having an outwardly extending flange or ring 16 disposed about the top thereof and arranged to support the receptacle in an aperture in the cooking top 17. Customarily the aperture in which the deep well heating unit is supported is located near the backsplasher 18 at the rear of the cooking top. At the bottom of receptacle 15 suitable means such as inturned flange 19 are provided to support a surface heating unit 20. As illustrated in the drawing surface heating unit 20 may comprise a support ring 21, a plurality of radial arms forming a supporting spider 22 and a coiled sheath type heating element 23 resting on the spider. To accommodate the portion of pressure valve 7 which projects beyond the side wall of vessel 1, a slot 24 is provided in the upper edge of receptacle 15 and flange 16; the width of slots 24 is only slightly greater than the width of guide member 14 so that vessel 1 can be placed in receptacle 15 and seated on heating unit 20 only when valve 7 is aligned with slot 24. At the top of slot 24 a cam member 24a is secured to receptacle 15 to engage plunger 9 and force it to its innermost position when the vessel is placed in the receptacle. To further insure the proper location of pressure valve 7 with respect to certain control system elements hereinafter described, the inner diameter of ring 16 is only slightly greater than the diameter of vessel 1.

Cooperating with plunger 9 of pressure valve 7 when vessel 1 is supported in receptacle 15 is a control switch mounted on the outer surface of receptacle 15 and generally designated by the reference numeral 25. Switch 25 comprises an insulated supporting block 26, a pair of spaced-apart contacts 27 and 28 supported on flexible leaves 29 and 30 respectively, and a movable contact 31 supported between fixed contacts 27 and 28 on leaf 32. Contact 31 is normally in contact with contact 27, but may be moved into contact with contact 28 by switch operating lever 33 pivotally mounted on a support block 34, which in turn is secured to receptacle 15. Lever 33 is actuated from the position shown in Fig. 3 to the position shown in Fig. 4 by outward movement of plunger 9 from its intermediate sealing position to its extended sealing position. Also cooperating with lever 33 is a bimetallic arm 35 generally parallel to the side wall of receptacle 15 and secured at one end to a mounting block 36 which in turn is secured by any suitable means to receptacle 15. Bimetallic arm 35 is normally biased against lever 33, and thus against enlarged end portion 11 of plunger 9, with sufficient force to overcome the force exerted on plunger 9 by normal cooking pressure within vessel 1 in addition to the force required to force the intermediate enlarged portion 13 of plunger 9 through the opening in gasket 8. However arm 35 is movable to the position shown in dotted lines in Fig. 1 by the heat supplied by a heating element 37 associated therewith. Thus when heating element 37 is energized bimetallic arm 35 moves out of interfering relation with lever 33 and permits plunger 9 to actuate switch 25 in accordance with the pressure within vessel 1. De-energization of heating element 37 causes arm 35 to return to the position shown in solid lines in Fig. 1 and to apply a force to plunger 9 sufficient to return it to its retracted venting position.

Referring now to Fig. 6, heating unit 20 is connected in series with control switch 25 which normally connects the heating unit to the outer conductors 38, 39 of a three conductor source of electrical energy, thus providing a voltage across the heating unit of 236 volts, for example. However as more fully described hereinafter switch 25 is operable to connect heating unit 20 to outer conductor 39 and neutral conductor 40 so that it is energized at 118 volts, for example, thus effecting a substantial reduction in its heat output. The energization of heating unit 20 is also controlled by time switch means adapted to be manually set to connect the heating unit to the energy source. In the embodiment herein disclosed the time switch means include switch contact 41 connecting conductor 38 and contact 27 of switch 25, switch contact 42 connecting conductor 39 and one terminal of heating unit 20, cams 43 and 44 for actuating contacts 41 and 42 respectively, timer motor 45 for rotating cams 43 and 44, and a manually operable control knob 46. As diagrammatically illustrated in Fig. 6, cams 43 and 44, motor 45 and knob 46 are all mounted on a common shaft which may be rotated by motor 45 or by knob 46. These elements may be mounted in any convenient location in the range affording easy access to knob 46; for example, the switch elements and timer motor may be mounted behind backsplasher 18 with one end of the common shaft extending therethrough and supporting knob 46.

The heating circuit may be traced from conductor 39 through time switch contact 42, conductor 47, heating unit 20, conductor 48, contacts 27 and 31 of switch 25, conductor 49, conductor 50, and finally through time switch contact 41 to supply conductor 38. This heating circuit is modified so as to reduce the heat output of heating unit 20 when control switch 25 is actuated to the position shown in Fig. 4 by plunger 9, the circuit then being traceable from contact 31 to contact 28, conductor 51, conductor 52, and finally to neutral supply conductor 40. From the foregoing it will be evident that when the elements of switch 25 are in the positions shown in Figs. 1, 3 and 6, heating unit 20 is energized at a relatively high voltage, for example 236 volts, and thus produces a relatively high heat output. And when contact 31 is moved to the position shown in Fig. 4 heating unit 20 is switched to a relatively lower voltage, for example 118 volts, and consequently produces a substantially lower heat output. It will be noted that heater 37 associated with bimetallic arm 35 is connected across wires 47 and 52, and hence is energized concurrently with heating unit 20 regardless of whether switch contact 31 is in engagement with contact 27 or contact 28. Time switch motor 45 is so connected between time switch contact 41 and switch 25 that it is energized when contact 31 of switch 25 engages contact 28. The circuit for timer motor 45 may be traced from supply conductor 38 through switch contact 41, conductor 50, conductor 53, timer motor 45, conductor 54, conductor 48, contacts 31 and 28, and through conductors 51 and 52 to neutral supply conductor 40.

In describing the operation of my invention it will first be assumed that water and the food to be cooked have been placed in vessel 1, the cover installed and sealed, and the vessel placed in receptacle 15 in the position shown in Fig. 1. Next control knob 46 is rotated to a setting corresponding to the number of minutes required to cook the food at the pressure maintained in vessel 1, which preferably is approximately fifteen pounds per square inch. After these operations have been performed by the housewife no further attention on her part is required and the cooking operation is completed automatically, terminating with the venting of the vessel so that the cover may be safely unsealed and removed to permit removal of the food.

Rotation of control knob 46 to any position on the numbered scale closes contacts 41 and 42, thus energizing heating unit 20 at 236 volts since contact 31 of switch 25 is initially in the position shown in Fig. 6. As the water in vessel 1 is brought to a boil steam drives the air in the vessel out through pressure valve 7 (which is initially in the venting position) until steam starts to escape, at which time some of the steam condenses and forms a water seal around plunger 9. Internal pressure then increases sufficiently to move plunger 9 to its intermediate sealing position in which enlarged portion 13 engages portion 8a of gasket 8. Closure of contacts 41 and 42 also effects the energization of heating element 37, thus causing bimetallic arm 35 to move away from receptacle 15 into the position shown in dotted lines in Fig. 1. Thus, as also shown in Fig. 4, bimetallic arm 35 is disengaged from operating lever 33 and the lever is free to move to the position shown in Fig. 4 when the pressure in vessel 1 reaches a predetermined value.

In accordance with my invention heating unit 20 is energized at substantially its full wattage until the desired cooking pressure is approached at which time the heat output of the heating unit is reduced and the timed cooking period is started. These changes are effected when the pressure in vessel 1 rises sufficiently to force enlarged portion 13 of plunger 9 through the opening in gasket 8, thus causing disengagement of contacts 27 and 31 and engagement of contact 31 with contact 28. The pressure at which this outward movement of plunger 9 to its extended sealing position takes place depends of course on the resilience of gasket 8 as well as the relative sizes of the opening in the gasket and the enlarged portions of plunger 9; preferably it is somewhat below the desired cooking pressure to minimize the "overshoot" of temperature and pressure which might otherwise occur. For example, pressure valve 7 may be constructed and arranged so that plunger 9 is moved to its extended sealing position when the pressure in vessel 1 reaches twelve pounds per square inch if the apparatus is designed for a normal cooking pressure of fifteen pounds per square inch.

The actuation of contact 31 into engagement with contact 28 rather than contact 27 reduces the voltage applied to heating unit 20 and energizes timer motor 45, thus initiating the timed cooking period. When timer motor 45 has driven control knob 46 and the cams 43 and 44 to the off position shown in Fig. 6, contacts 41 and 42 are opened, thus de-energizing heating unit 20, heating element 37 and the timer motor. Bimetallic arm 35 quickly cools, and in doing so moves into engagement with lever 33 with a biasing force sufficient to overcome the pressure in vessel 1 and force plunger 9 into its retracted venting position. Thus when the cooking operation is completed the pressure cooking apparatus is completely de-energized, the pressure in vessel 1 is reduced to atmospheric pressure and the cover may be safely removed.

During the cooking operation pressure relief valve 5 opens whenever the pressure in vessel 1 exceeds the normal cooking pressure and thus maintains the desired pressure in the vessel. In the event relief valve 5 becomes clogged or for any reason fails to operate properly pressure valve 7 will prevent a pressure rise to an abnormally high value inasmuch as plunger 9 may be blown completely out of gasket 8 if the pressure rises too far above the normal cooking pressure. Thus pressure valve 7 functions as a safety valve as well as a control valve for controlling the operation of the apparatus.

From the foregoing description it will be seen that I have provided an improved automatic pressure cooker which is easy to operate, relatively simple in construction, and which may be easily incorporated in an electric range. Furthermore the pressure valve utilized to control the apparatus is practically non-clogging and its plunger may be readily removed for cleaning by the housewife.

While I have shown and described a specific embodiment of my invention, I do not desire my invention to be limited to the particular construction shown and described and I intend by the appended claims to cover all modifications within the true spirit and scope of my invention.

What I claim as new and desire to secure by Letters Patent of the United States is:

1. Pressure cooking apparatus comprising a pressure vessel, an electric heating unit for heating said vessel, a heat control circuit including a control switch for modifying the circuit so as to reduce the heat output of said heating unit, a pressure relief valve in said vessel for maintaining a predetermined normal cooking pressure, a pressure valve in said vessel having a plunger movable from a pressure venting position to a first sealing position in response to a predetermined increase in pressure within the vessel and also movable to a second sealing position in response to a further increase in pressure within the vessel, means actuated by movement of said plunger from said first sealing position to said second sealing position for operating said control switch, means normally biased against said plunger with sufficient force to overcome the force exerted on said plunger by said normal cooking pressure, and means for disengaging said last mentioned means from said plunger upon energization of said heating unit.

2. Pressure cooking apparatus comprising a pressure vessel, an electric heating unit for heating said vessel, a heat control circuit including a control switch for modifying the circuit so as to reduce the heat output of said heating unit, a pressure relief valve in said vessel for maintaining a predetermined normal cooking pressure, a pressure valve in said vessel having a plunger movable from a pressure venting position to a first sealing position in response to a predetermined increase in pressure within the vessel and also movable from said first sealing position to a second sealing position in response to a further increase in pressure within the vessel, means actuated by movement of said plunger from said first sealing position to said second sealing position for operating said control switch, a bimetallic arm normally biased against said plunger with sufficient force to overcome the force exerted on said plunger by said normal cooking pressure, and a heating element associated with said bimetallic arm for moving said arm out of engagement with said plunger, said heating element being connected in said circuit so as to be energized simultaneously with said heating unit.

3. Pressure cooking apparatus comprising a pressure vessel, an electric heating unit for heating said vessel, a heat control circuit including a control switch for modifying the circuit so as to reduce the heat output of said heating unit, a pressure relief valve in said vessel for maintaining a predetermined normal cooking pressure, a resilient deformable gasket having a central opening secured in an aperture in one wall of said vessel, a plunger mounted in said opening for reciprocating movement in accordance with the pressure in said vessel, means actuated by said plunger for operating said control switch, said plunger including first and second enlarged end portions of substantially greater cross-sectional area than the cross-sectional area of said opening, said first end portion being inside and said second end portion outside said vessel, an intermediate stem portion of smaller cross-sectional area than the cross-sectional area of said opening, and an intermediate enlarged portion on said stem having a cross-sectional area less than the cross-sectional area of said end portions but greater than the cross-sectional area of said opening, means normally biased against said plunger with sufficient force to overcome the force exerted on said plunger by said normal cooking pressure in addition to the force required to force said intermediate enlarged portion through said opening in said gasket, and means for disengaging said last mentioned means from said plunger upon energization of said heating unit.

4. Pressure cooking apparatus comprising a pressure vessel, an electric heating unit for heating said vessel, a heat control circuit including a control switch for modifying the circuit so as to reduce the heat output of said heating unit, a pressure relief valve in said vessel for maintaining a predetermined normal cooking pressure, a resilient deformable gasket having a central opening secured in an aperture in one wall of said vessel, a plunger mounted in said opening for reciprocating movement in accordance with the pressure in said vessel, means actuated by said plunger for operating said control switch, said plunger including first and second enlarged end portions of substantially greater cross-sectional area than the cross-sectional area of said opening, said first end portion being inside and said second end portion outside said vessel, an intermediate stem portion of smaller cross-sectional area than the cross-sectional area of said opening, and an intermediate enlarged portion on said stem having a cross-sectional area less than the cross-sectional area of said end portions but greater than that of said opening, a bimetallic arm normally biased against said second end portion of said plunger with sufficient force to overcome the force exerted on said plunger by said normal cooking pressure in addition to the force required to force said intermediate enlarged portion through said opening in said gasket, and a heating element associated with said bimetallic arm for moving said arm out of engagement with said plunger, said heating element being connected in said circuit so as to be energized simultaneously with said heating unit.

5. Pressure cooking apparatus comprising a pressure vessel, an electric heating unit for heating said vessel, a heat control circuit including a control switch for modifying the circuit so as to reduce the heat output of said heating unit, a time switch arranged to interrupt the power supply of said heating unit at the end of a preset cooking period, a pressure relief valve in said vessel for maintaining a predetermined normal cooking pressure, a resilient deformable gasket having a circular opening secured in an aperture in one wall of said vesssel, a cylindrical plunger mounted in said opening for reciprocating movement in accordance with the pressure in said vessel, said plunger including first and second enlarged end portions of substantially greater diameter than the diameter of said opening, said first end portion being inside and said second end portion outside said vessel, an intermediate stem portion of smaller diameter than the diameter of said opening, and an intermediate enlarged portion on said stem having a diameter less than the diameter of said end portions but greater than that of said opening, a lever movable by said plunger for operating said control switch, a bimetallic arm normally biased against said second end portion of said plunger with sufficient force to overcome the force exerted on said plunger by said normal cooking pressure in addition to the force required to force said intermediate enlarged portion through said opening in said gasket, and a heating element associated with said bimetallic arm for moving said arm out of engagement with said plunger, said heating element being connected in said circuit so as to be energized simultaneously with said heating unit.

6. Pressure cooking apparatus comprising a receptacle adapted to be supported in an opening in the cooking top of an electric range, means disposed about the top of said receptacle for engaging said cooking top and supporting said receptacle in said opening, a horizontally disposed electric heating unit in the bottom of said receptacle, a pressure vessel adapted to be supported in said receptacle in heat transfer relation with said heating unit, a bimetallic arm generally parallel to a side wall of said receptacle and secured at one end to the outer surface thereof, an electric heating element connected in circuit with said heating unit and associated with said arm so as to supply heat thereto for moving said arm away from said receptacle when said heating unit is energized, a control switch in circuit with said heating unit and mounted on said receptacle, said switch being operable to modify the circuit so as to reduce the heat output of said heating unit, a pressure relief valve in said vessel for maintaining a predetermined normal cooking pressure therein, a pressure valve in said vessel including a movable plunger projecting therefrom through an opening in the side wall of said receptacle adjacent said control switch and movable from a retracted venting position to an intermediate sealing position in response to a predetermined increase in pressure within the vessel and to an extended sealing position in response to a further increase in pressure within the vessel, said plunger engaging and operating said control switch during movement from said intermediate to said extended position, said plunger being normally biased to said retracted venting position by the free end of said bimetallic arm and being free to move to said intermediate and extended positions only when said bimetallic arm is moved away from said receptacle by heat from said heating element.

7. Pressure cooking apparatus comprising a receptacle adapted to be supported in an opening in the cooking top of an electric range, means including a ring disposed about the top of said receptacle for engaging said cooking top and supporting said receptacle for engaging said cooking top and supporting said receptacle in said opening, a horizontally disposed electric heating unit in the bottom of said receptacle, a pressure vessel adapted to be supported in said receptacle in heat transfer relation with said heating unit, a bimetallic arm generally parallel to a side wall of said receptacle and secured at one end to the outer surface thereof, an electric heating element connected in circuit with said heating unit and associated with said arm so as to supply heat thereto for moving said arm away from said receptacle when said heating unit is energized, a control switch in circuit with said heating unit and mounted on said receptacle, said switch being operable so as to reduce the heat output of said heating unit, a manually rotatable control knob adapted for movement between an "off" position and a time indicating position, cam means arranged for rotary movement with said knob, an electric timer motor arranged to drive said cam means and knob from said time indicating position to said "off" position, cam operated switching means arranged to be actuated by said cam means to connect said heating unit to a source of electrical energy, said timer motor being connected in circuit with said control switch whereby said timer motor is energized when said switch operates to reduce the heat output of said heating unit, a pressure relief valve in said vessel for maintaining a predetermined normal cooking pressure therein, a resilient deformable gasket having a circular opening secured in an aperture in one wall of said vessel, a cylindrical plunger mounted in said opening for reciprocating movement in accordance with the pressure in said vessel, said plunger including first and second enlarged end portions of substantially greater diameter than the diameter of said opening, said first end portion being inside and said second end portion outside said vessel, an intermediate stem portion of smaller diameter than the diameter of said opening, and an intermediate enlarged portion on said stem having a diameter less than the diameter of said end portions but greater than that of said opening, a lever movable by said plunger for operating said control switch, said bimetallic arm being normally biased against the said second end portion of said plunger with sufficient force to overcome the force exerted on said plunger by said normal cooking pressure in addition to the force required to force said intermediate enlarged portion through said opening in said gasket.

References Cited in the file of this patent
UNITED STATES PATENTS

| | | |
|---|---|---|
| 2,308,603 | Graham | Jan. 19, 1943 |
| 2,369,932 | Allen | Feb. 20, 1945 |
| 2,422,974 | Newell | June 24, 1947 |
| 2,472,451 | Whitney | June 7, 1949 |
| 2,515,879 | Korn | July 18, 1950 |
| 2,641,680 | Turner | June 9, 1953 |